United States Patent
Wakao et al.

(10) Patent No.: US 10,161,367 B2
(45) Date of Patent: Dec. 25, 2018

(54) FUEL SHUTOFF STRUCTURE

(71) Applicant: HONDA MOTOR CO., LTD., Tokyo (JP)

(72) Inventors: Masaki Wakao, Wako (JP); Kiyofumi Shida, Wako (JP); Akira Isayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 15/185,600

(22) Filed: Jun. 17, 2016

(65) Prior Publication Data

US 2016/0369755 A1  Dec. 22, 2016

(30) Foreign Application Priority Data

Jun. 22, 2015  (JP) .................. 2015-124320

(51) Int. Cl.
   *F02M 37/00*  (2006.01)
   *F02M 25/08*  (2006.01)
   (Continued)

(52) U.S. Cl.
   CPC ...... *F02M 37/0023* (2013.01); *F02M 25/089* (2013.01); *F02M 37/0017* (2013.01); *F02M 37/0082* (2013.01); *B60K 15/03006* (2013.01); *F02M 37/0094* (2013.01); *F02M 37/025* (2013.01)

(58) Field of Classification Search
   CPC ............. F02M 25/0836; F02M 25/089; F02M 37/0076; F02M 25/08; F02M 25/0872; F02M 37/10
   See application file for complete search history.

(56) References Cited

U.S. PATENT DOCUMENTS 5,392,804 A * 2/1995 Kondo ............. B60K 15/03519
                                              123/519
5,617,832 A * 4/1997 Yamazaki ............. F02D 41/003
                                              123/198 D
(Continued)

FOREIGN PATENT DOCUMENTS

CN      101024375 A     8/2007
JP      S55-61539 U     4/1980
(Continued)

OTHER PUBLICATIONS

Office Action dated Sep. 27, 2016, issued in counterpart Japanese Patent Application No. 2015-124320. (4 pages).
(Continued)

*Primary Examiner* — Long T Tran

(74) *Attorney, Agent, or Firm* — Westerman, Hattori, Daniels & Adrian, LLP

(57) ABSTRACT

A fuel shutoff structure that prevents a fuel outflow to an external fuel line of a fuel tank mounted on a vehicle includes a fuel shutoff valve provided in the rear section of the fuel tank and a canister that is provided so as to be located across the front section of the fuel tank from the fuel shutoff valve and that is connected to the external fuel line, in which an in-tank fuel line extending from the fuel shutoff valve and the external fuel line are connected to each other at a location that is different from the fuel shutoff valve.

13 Claims, 6 Drawing Sheets

(51) Int. Cl.
*B60K 15/03* (2006.01)
*F02M 37/02* (2006.01)

(56) References Cited

U.S. PATENT DOCUMENTS

| | | | | | |
|---|---|---|---|---|---|
| 5,647,334 | A | * | 7/1997 | Miller | F02M 25/0818 123/520 |
| 5,669,361 | A | * | 9/1997 | Weissinger | B60K 15/03519 123/520 |
| 5,901,689 | A | * | 5/1999 | Kimura | B60K 15/03504 123/518 |
| 6,302,137 | B1 | * | 10/2001 | Devall | B60K 15/035 137/202 |
| 7,520,293 | B2 | * | 4/2009 | Hilderley | B60K 15/035 137/202 |
| 8,210,305 | B2 | * | 7/2012 | Koike | B62J 35/00 180/219 |
| 8,286,658 | B2 | * | 10/2012 | Devall | B60K 15/03504 123/518 |
| 8,939,130 | B2 | * | 1/2015 | Shimura | B60K 15/03519 123/521 |
| 2006/0283501 | A1 | * | 12/2006 | Devall | B60K 15/03504 137/43 |
| 2012/0186333 | A1 | * | 7/2012 | Nishimura | F02M 25/0809 73/40.5 R |
| 2014/0238515 | A1 | * | 8/2014 | Thirlaway | B60K 15/03 137/576 |

FOREIGN PATENT DOCUMENTS

| | | |
|---|---|---|
| JP | H04-86524 U | 7/1992 |
| JP | 2003-267075 A | 9/2003 |
| JP | 2004-124903 A | 4/2004 |
| JP | 2006-183596 A | 7/2006 |
| JP | 2006-218900 A | 8/2006 |
| JP | 2009-226960 A | 10/2009 |
| JP | 2010-190152 A | 9/2010 |
| JP | 2014-094709 A | 5/2014 |

OTHER PUBLICATIONS

Office Action dated Mar. 29, 2018, issued in counterpart Chinses Application No. 201610274828.5, with English translation (9 pages).

* cited by examiner

FUEL SHUTOFF STRUCTURE

CROSS REFERENCES TO RELATED APPLICATIONS

The present application claims priority under 35 U.S.C. § 119 to Japanese Patent Application No. 2015-124320, filed Jun. 22, 2015, entitled "Fuel Shutoff Structure." The contents of this application are incorporated herein by reference in their entirety.

The present disclosure relates to a fuel shutoff structure.

BACKGROUND

Recently, various techniques for flattening a vehicle fuel tank have been developed to meet the needs for a roomier passenger compartment. A flattened fuel tank has a larger dead space in an upper portion thereof which may cause a problem of a reduction in a substantial filling amount of the fuel tank. To solve such a problem, a technique for reducing the dead space through the flattening of a fuel shutoff valve structure has been proposed (see, for example, Japanese Unexamined Patent Application Publication No. 2006-183596).

However, if the technique disclosed in Japanese Unexamined Patent Application Publication No. 2006-183596 is applied to further flatten the fuel tank, a fuel shutoff valve may become submerged in fuel in the fuel tank when the vehicle is inclined, causing a fuel outflow to a canister.

SUMMARY

The present application describes, for example, a fuel shutoff structure that can prevent a fuel outflow to a canister.

A first aspect of the present application provides a fuel shutoff structure that prevents a fuel outflow to an external passage disposed outside of a fuel tank mounted on a vehicle, which includes a fuel shutoff valve provided in any one of front and rear sections of the fuel tank and a canister that is provided so as to be located across the other section from the fuel shutoff valve and that is connected to a downstream side of the external passage, in which an in-tank passage extending from the fuel shutoff valve and the external passage are connected to each other at a location that is different from the fuel shutoff valve.

With this arrangement, in the case where the fuel shutoff valve is provided in, for example, the rear section of the fuel tank and the canister is provided in front of the fuel tank, even if the vehicle is inclined with its rear tilting downward and, as a result, the fuel shutoff valve becomes submerged in the fuel, the fuel of the fuel tank can be prevented from flowing into the canister since the in-tank passage is inclined upward toward the front of the vehicle.

In addition, in the case where the fuel shutoff valve is provided in the front section of the fuel tank and the canister is provided behind the fuel tank, even if the vehicle is inclined with its front tilting downward and, as a result, the fuel shutoff valve becomes submerged in the fuel, the fuel of the fuel tank can be prevented from flowing into the canister since the in-tank passage is inclined upward toward the rear of the vehicle.

A second aspect of the present application provides the fuel shutoff structure in which the fuel shutoff valve may be disposed in the rear section of the fuel tank and the rear section may be configured to be higher than the front section.

This arrangement enables the creation of a space in which the fuel shutoff valve is operable (or a float valve is operable), thereby providing a tank capacity large enough to activate an automatic shutoff device of a refueling gun.

A third aspect of the present application provides a fuel shutoff structure that prevents a fuel outflow to an external passage disposed outside of a fuel tank mounted on a vehicle, which includes a fuel shutoff valve provided in any one of right and left sections of the fuel tank and a canister that is provided so as to be located across the other section from the fuel shutoff valve and that is connected to a downstream side of the external passage, in which an in-tank passage extending from the fuel shutoff valve and the external passage may be connected to each other at a location that is different from the fuel shutoff valve.

With this arrangement, in the case where the fuel shutoff valve is provided in, for example, the left section of the fuel tank and the canister is provided to the right of the fuel tank, even if the vehicle is inclined with its right side tilting upward and, as a result, the fuel shutoff valve becomes submerged in the fuel, the fuel of the fuel tank can be prevented from flowing into the canister since the in-tank passage is inclined upward toward the right side of the vehicle.

In addition, in the case where the fuel shutoff valve is provided in the right section of the fuel tank and the canister is provided to the left of the fuel tank, even if the vehicle is inclined with its left side tilting upward and, as a result, the fuel shutoff valve becomes submerged in the fuel, the fuel of the fuel tank can be prevented from flowing into the canister since the in-tank passage is inclined upward toward the left side of the vehicle.

A fourth aspect of the present application provides the fuel shutoff structure in which the in-tank passage and the external passage may be connected to each other via a joint disposed on an upper surface of the fuel tank.

This arrangement can increase a full-tank capacity of the fuel tank and can reduce the amount of fuel that goes through the fuel tank.

The fuel shutoff structure according to the present application can prevent a fuel outflow to a canister.

BRIEF DESCRIPTION OF THE DRAWINGS

The advantages of the disclosure will become apparent in the following description taken in conjunction with the following drawings.

DETAILED DESCRIPTION

Fuel shutoff structures 100A, 100B, 100C according to an embodiment of the present application will be described below with reference to FIGS. 1 through 6. In this description, references to "front", "rear", "right", "left", "top", and "bottom" of a vehicle are relative to the driver's position in the driver's seat. The attached drawings show fuel tanks 10A, 10B, 10C and their surrounding components only.

First Embodiment

Figure 1:
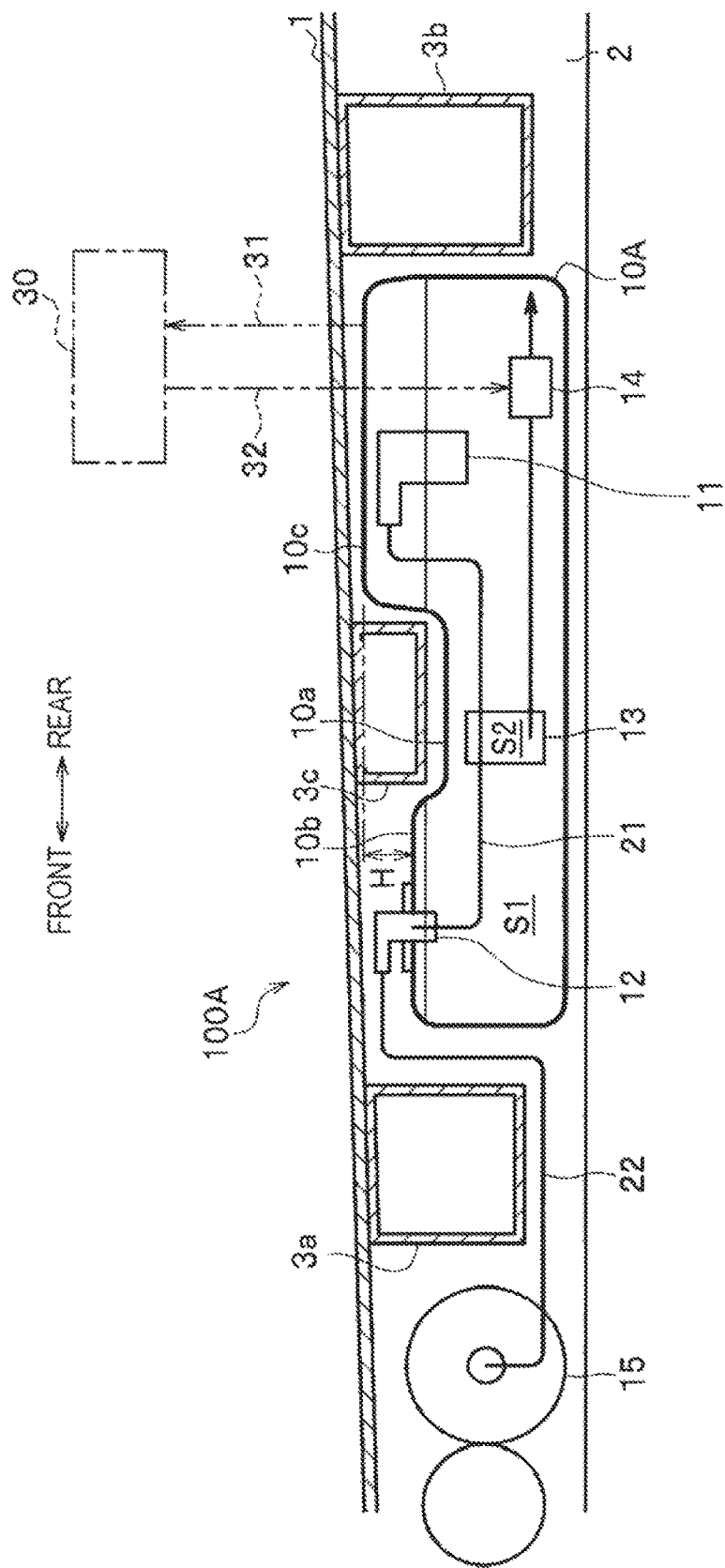
FIG. 1 is a longitudinal sectional view of a fuel shutoff structure according to a first embodiment.
Figure 2:
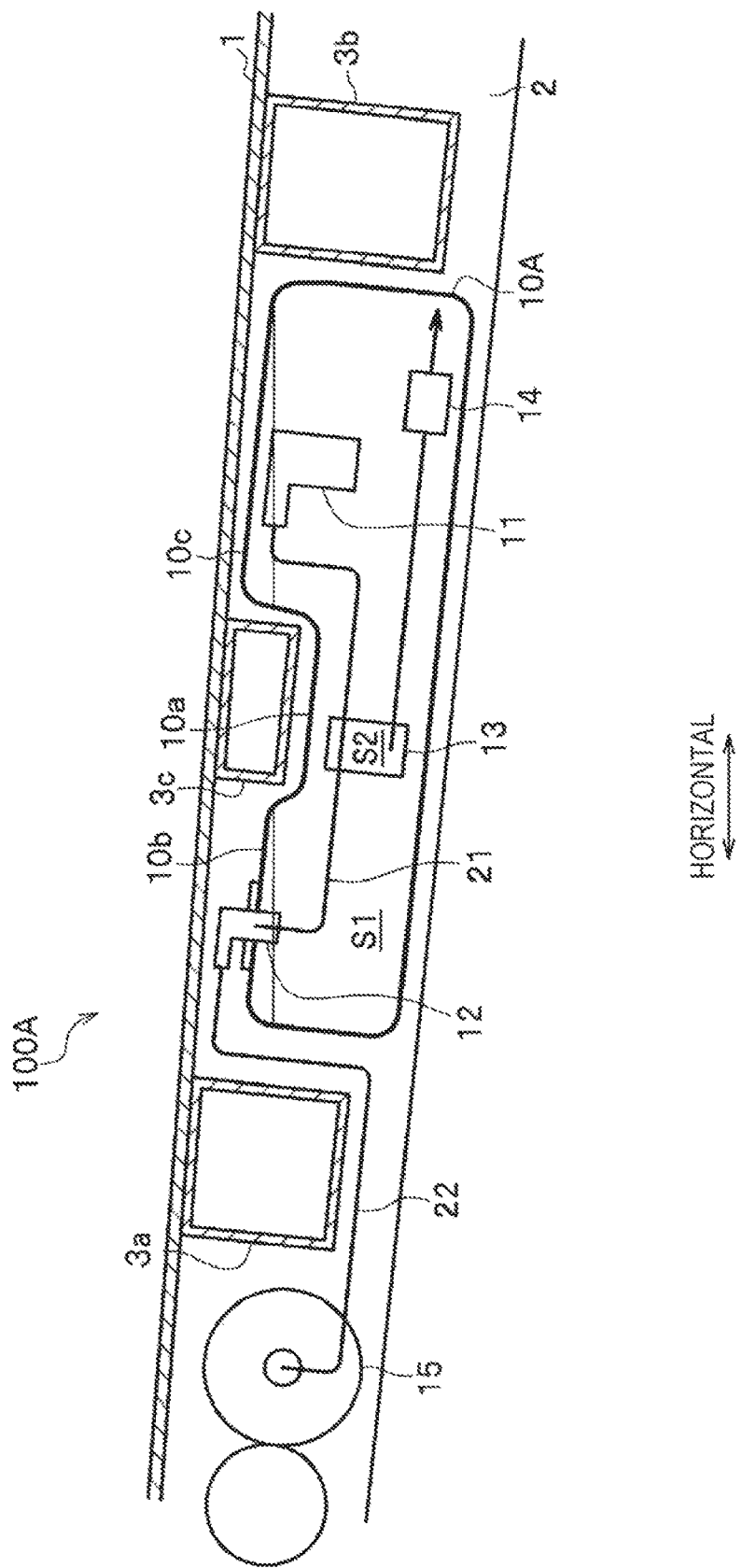
FIG. 2 is a sectional view of a fuel shutoff structure according to a first embodiment when a vehicle is inclined with its rear tilting downward.

FIG. 1 is a longitudinal sectional view of a fuel shutoff structure according to a first embodiment. FIG. 2 is a sectional view of the fuel shutoff structure according to the first embodiment when the vehicle is inclined with its rear tilting downward. FIGS. 1 and 2 omit the illustrations of a fuel pump that feeds fuel from a fuel tank 10A to an internal combustion engine 30 through a fuel line 31, a filler pipe that connects the fuel tank 10A and a fuel filler opening, and the like.

As shown in FIG. 1, a fuel shutoff structure 100A according to the first embodiment includes a fuel tank 10A, a fuel shutoff valve 11, a joint 12, a chamber 13, a jet pump 14, and a canister 15.

The fuel tank 10A is disposed on a reverse side of a floor panel 1 constituting a vehicle floor. The fuel tank 10A is formed in a flattened shape and is disposed within a space enclosed by side frames 2 extending in the longitudinal direction of the vehicle (hereinafter referred to as "longitudinal direction") and cross members 3a, 3b extending in the horizontal direction of the vehicle (hereinafter referred to as "vehicle-width direction"). A cross member 3c smaller than the cross members 3a, 3b projects downward from the reverse side of the floor panel 1 between the cross members 3a, 3b. In addition, a recess 10a is formed on the top of the fuel tank 10A so as to be substantially in parallel to the cross member 3c.

The fuel tank 10A includes a hollow container made of synthetic resin that has a space S1 for storing gasoline, diesel fuel, or other liquid fuel and is secured to a vehicle body with a tank band (not illustrated). In addition, the fuel tank 10A is constructed in such a manner that, when seen in side view, a rear upper surface 10c located closer to the rear of the vehicle in the longitudinal direction is higher than a front upper surface 10b located closer to the front in the longitudinal direction. This is because a floor surface (namely, the floor panel 1) somewhat rises upward toward the rear as often seen in minivans.

In addition, the fuel tank 10A is provided with the fuel shutoff valve 11, the joint 12, the chamber 13, the jet pump 14, and the like. Furthermore, the canister 15 is disposed in front of the fuel tank 10A.

The fuel shutoff valve 11 is disposed in the rear section of the fuel tank 10A and, when the vehicle is filled up with fuel, blocks an opening (not illustrated) to an in-tank fuel line 21 (in-tank passage). The in-tank fuel line 21 is disposed inside the fuel tank 10A so as to run along upper surfaces (including a front upper surface 10b, the recess 10a, and a rear upper surface 10c) of the fuel tank 10A. As described above, the in-tank fuel line 21 has a layout in which fuel is easily accumulated.

The joint 12 provides a direct connection between the in-tank fuel line 21 connected to the fuel shutoff valve 11 and an external fuel line 22 (external passage) connected to the canister 15. In addition, the joint 12 is disposed on the front section of the fuel tank 10A or, in other words, between the fuel shutoff valve 11 and the canister 15. Furthermore, the joint 12 is located on the front upper surface 10b of the fuel tank 10A.

The chamber 13 is connected to the in-tank fuel line 21 and has a space S2 in which fuel coming from the fuel shutoff valve 11 is accumulated. In addition, the chamber 13 is connected to the jet pump 14 that sucks up (or sucks out) and returns fuel accumulated in the space S2 from the chamber 13 to the space S1 of the fuel tank 10A. The jet pump 14 is connected to a fuel return line 32 extending from the engine 30 and produces suction power due to negative pressure generated when fuel is returned through the fuel return line 32.

The canister 15 is provided in front of the fuel tank 10A so as to be located across the front section of the fuel tank 10A from the fuel shutoff valve 11 and is connected to the joint 12 via the external fuel line 22. The external fuel line 22 is disposed along the upper surface (the front upper surface 10b) of the fuel tank 10A and an external surface of the cross member 3a and is connected to the canister 15.

In addition, the canister 15 contains active carbon and the like that can adsorb fuel vapors generated in the fuel tank 10A. Furthermore, the canister 15 uses intake air negative pressure of the engine 30 to suck air from the atmosphere and feed the air to a purge line (not illustrated), thereby purging the canister 15 of the fuel vapors that go into the engine 30 located outside of the canister 15.

As shown in FIG. 2, in the fuel shutoff structure 100A, the fuel shutoff valve 11 becomes submerged in the fuel if the fuel tank 10A is inclined with its rear tilting downward (namely, higher front and lower rear) when the vehicle is running on, for example, an ascending slope. At this time, the in-tank fuel line 21 is inclined upward toward the canister 15 (or the vehicle front), preventing the fuel from flowing into the in-tank fuel line 21 (because the joint 12 is located higher than the fuel shutoff valve 11). In contrast, if the fuel tank 10A is inclined with its front tilting downward (namely, lower front and higher rear), the fuel shutoff valve 11 does not become submerged in the fuel and accordingly the fuel does not flow into the in-tank fuel line 21 though not illustrated.

As described above, in the first embodiment, the fuel shutoff valve 11 is provided in the rear section (please note, can be provided in any one of front and rear sections) of the fuel tank 10A. In addition, the canister 15 connected to the external fuel line 22 is disposed so as to be located across the front section of the fuel tank 10A from the fuel shutoff valve 11 in the longitudinal direction. Furthermore, the in-tank fuel line 21 extending from the fuel shutoff valve 11 and the external fuel line 22 are connected to each other at a location that is different from the fuel shutoff valve 11 in the longitudinal direction. With this arrangement, even if the fuel shutoff valve 11 becomes submerged in the fuel when the fuel tank 10A is inclined in the longitudinal direction (with its rear tilting downward), the in-tank fuel line 21 is inclined upward toward the front of the vehicle, whereby the fuel of the fuel tank 10A can be prevented from flowing into the in-tank fuel line 21 and the (liquid-phase) fuel can be prevented from flowing out to the canister 15 from the fuel tank 10A. As described above, preventing an outflow of the liquid-phase fuel into the canister 15 eliminates the need to construct the canister 15 with a highly rigid material.

In addition, in the first embodiment, the fuel shutoff valve 11 is disposed in the rear section of the fuel tank 10A in such manner that the rear section (rear upper surface 10c) is higher by a dimension H than the front section (front upper surface 10b) in the longitudinal direction. With this arrangement, even an extremely low-floor vehicle equipped with an extremely low profile fuel tank 10A allows a sufficient clearance to be created between the floor panel 1 and an operating fluid level of the fuel shutoff valve 11, thereby providing a tank capacity large enough to activate an automatic shutoff device during refueling.

Furthermore, in the first embodiment, the in-tank fuel line 21 and the external fuel line 22 are connected to each other via the joint 12 disposed on the upper surface (front upper surface 10b). This arrangement can increase a full-tank capacity of the fuel tank 10A and at the same time can reduce the amount of fuel that goes through the fuel tank 10A.

Second Embodiment

Figure 3:
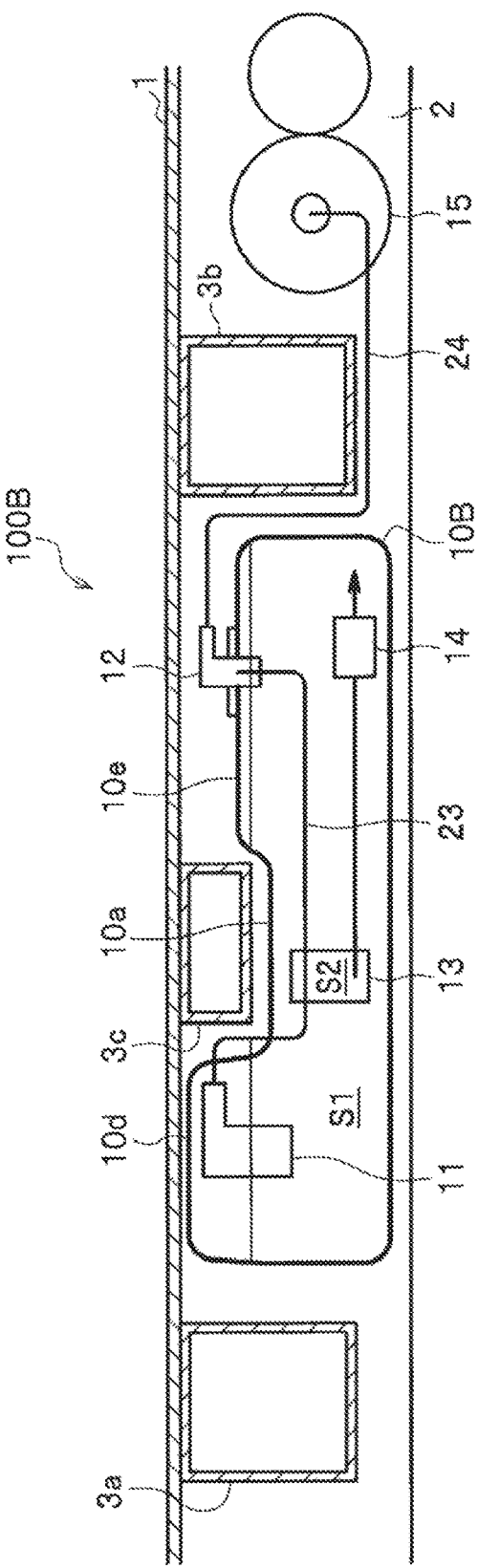
FIG. 3 is a longitudinal sectional view of a fuel shutoff structure according to a second embodiment.
Figure 4:
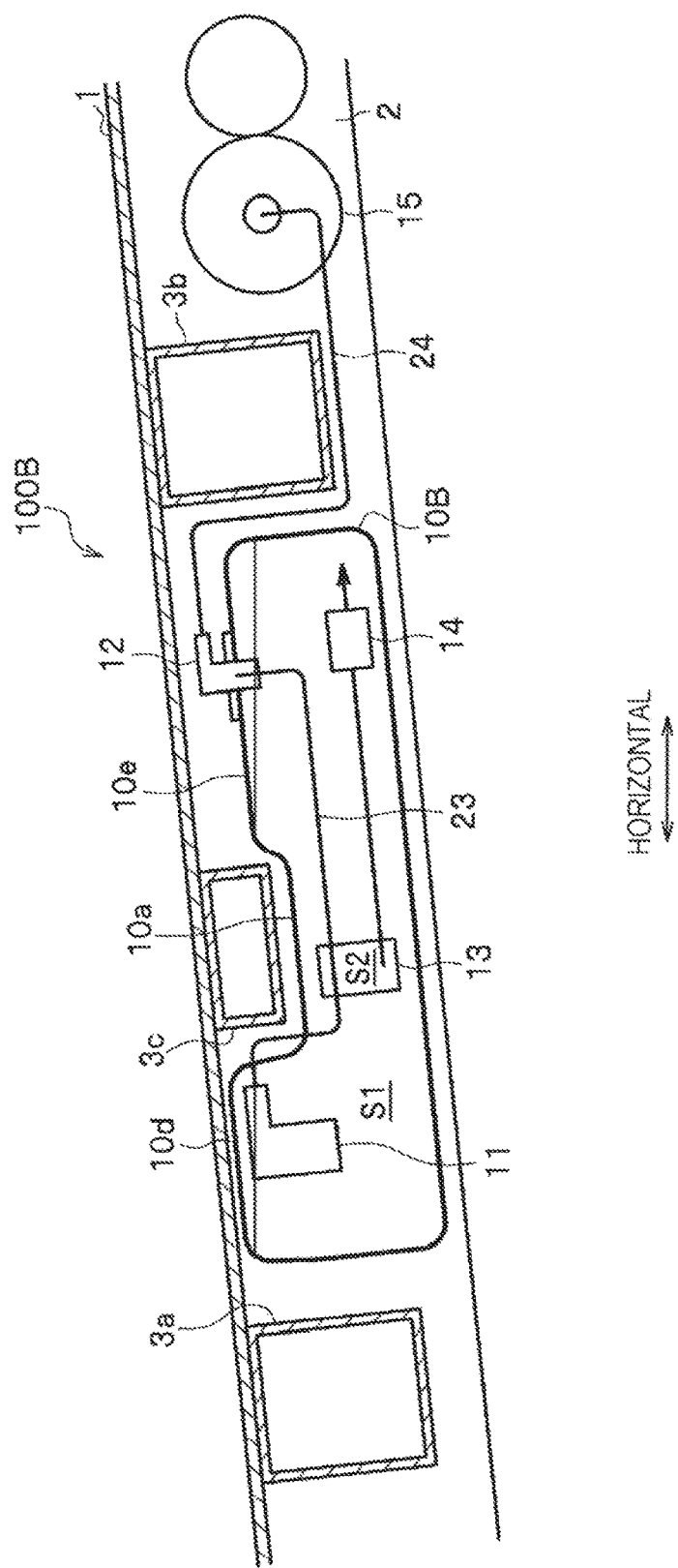
FIG. 4 is a sectional view of a fuel shutoff structure according to a second embodiment when a vehicle is inclined with its front tilting downward.

FIG. 3 is a longitudinal sectional view of a fuel shutoff structure according to a second embodiment. FIG. 4 is a sectional view of the fuel shutoff structure according to the second embodiment when a vehicle is inclined in the longitudinal direction. The reference numerals and symbols in the second embodiment refer to the same components as those with the same reference numerals and symbols in the first embodiment, and repeated descriptions of the same components are omitted. As shown in FIG. 3, a fuel shutoff structure 100B according to the second embodiment is different from the fuel shutoff structure according to the first embedment in the layout of the fuel shutoff valve 11, the joint 12, and the canister 15.

The fuel shutoff valve 11 is disposed in the front section of the fuel tank 10B in the longitudinal direction. An in-tank fuel line 23 is disposed inside the fuel tank 10B so as to run along upper surfaces (including a front upper surface 10d, the recess 10a, and a rear upper surface 10e). As described above, the in-tank fuel line 23 has a layout in which fuel is easily accumulated.

The joint 12 provides a direct connection between the in-tank fuel line 23 connected to the fuel shutoff valve 11 and an external fuel line 24 (external passage) connected to the canister 15. In addition, the joint 12 is disposed on the rear section of the fuel tank 10B or, in other words, between the fuel shutoff valve 11 and the canister 15. Furthermore, the joint 12 is located on the rear upper surface 10 e of the fuel tank 10B.

The canister 15 is disposed behind the fuel tank 10B so as to be located across the rear section of the fuel tank 10A from the fuel shutoff valve 11 in the longitudinal direction and is connected to the joint 12 via the external fuel line 24. The external fuel line 24 is disposed along the upper surface (the rear upper surface 10e) of the fuel tank 10B and an external surface of the cross member 3b and is connected to the canister 15.

As shown in FIG. 4, in the fuel shutoff structure 100B, the fuel shutoff valve 11 becomes submerged in the fuel if the fuel tank 10B is inclined with its front tilting downward (namely, lower front and higher rear) when the vehicle is running on, for example, a descending slope. At this time, the in-tank fuel line 23 is inclined upward toward the canister 15 (or the vehicle front), preventing the fuel from flowing into the in-tank fuel line 23. In contrast, if the fuel tank 10B is inclined with its rear tilting downward (namely, higher front and lower rear), the fuel shutoff valve 11 does not become submerged in the fuel and accordingly the fuel does not flow into the in-tank fuel line 23, though not illustrated.

In the second embodiment described above, even if the fuel shutoff valve 11 becomes submerged in the fuel, a fuel outflow to the canister 15 from the fuel tank 10B can be prevented, as is the case in the first embodiment.

Third Embodiment

Figure 5:
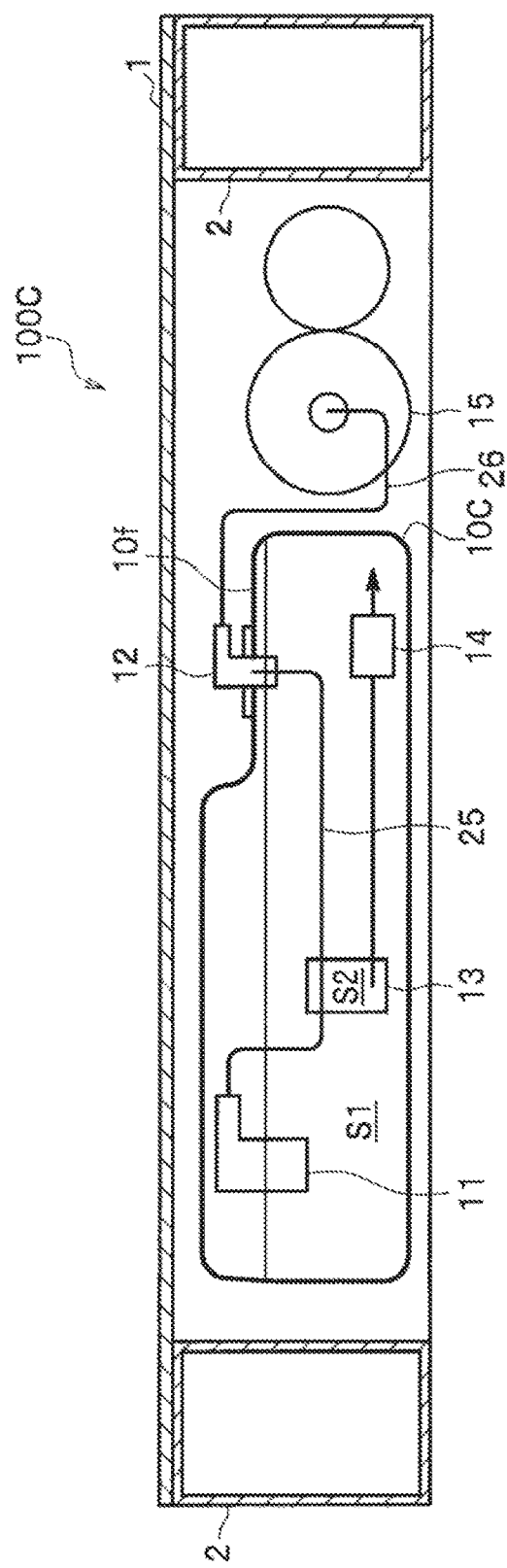
FIG. 5 is a vertical sectional view of a fuel shutoff structure according to a third embodiment.
Figure 6:
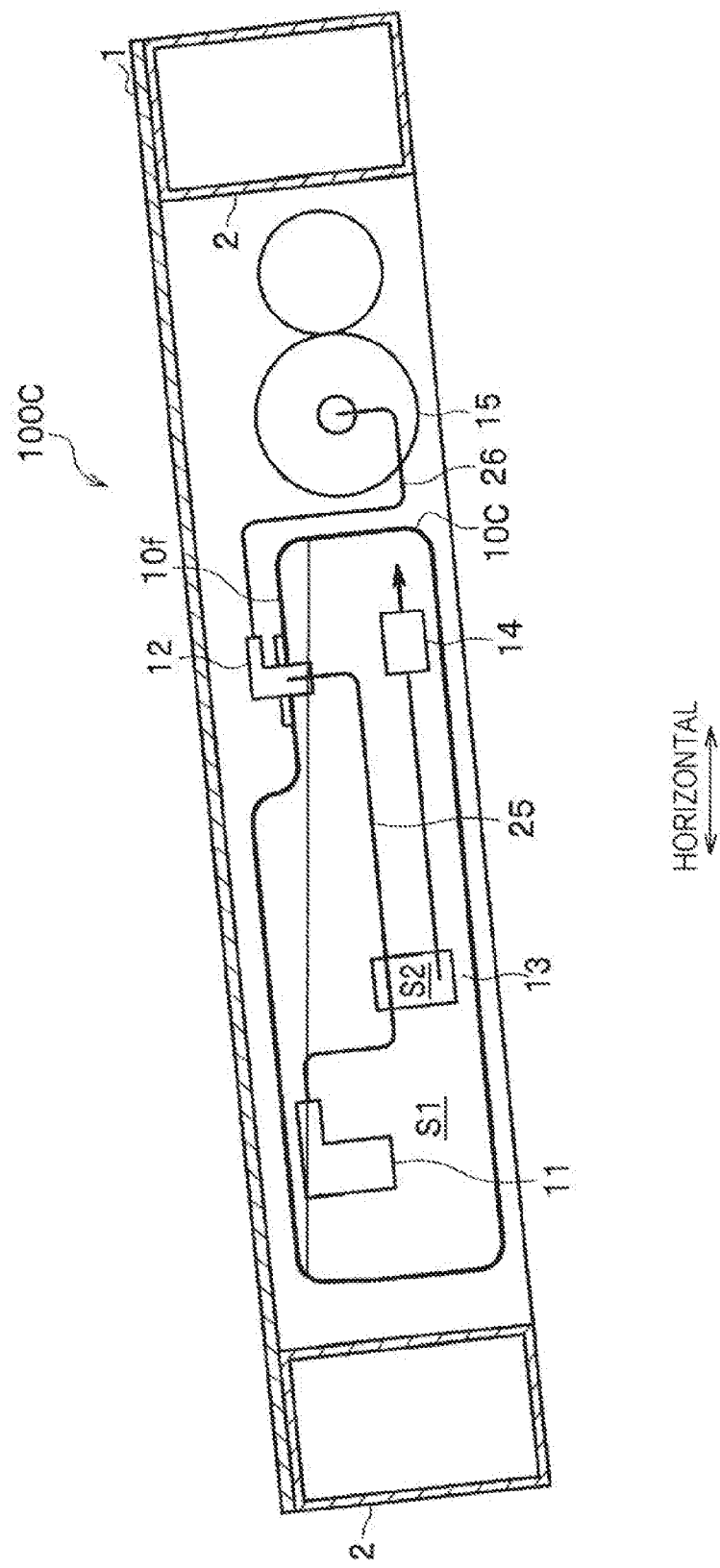
FIG. 6 is a sectional view of a fuel shutoff structure according to a third embodiment when a vehicle is inclined with its left side tilting downward.

FIG. 5 is a vertical sectional view of a fuel shutoff structure according to a third embodiment. FIG. 6 is a sectional view of the fuel shutoff structure according to the third embodiment when a vehicle is inclined in the vehicle-width direction. As shown in FIG. 5, the fuel shutoff structure 100C according to the third embodiment is different from the fuel shutoff structure according to the first and second embodiments in the layout of the fuel tank 10C, the fuel shutoff valve 11, the joint 12, and the canister 15.

The fuel tank 10C is disposed between the side frames 2, 2 (vehicle frames).

The fuel shutoff valve 11 is disposed in the left section in the vehicle-width direction of the fuel tank 10C. The in-tank fuel line 25 is disposed inside the fuel tank 10CA so as to have a concave shape in the fuel tank 10C when seen in front or rear side view. As described above, the in-tank fuel line 25 has a layout in which fuel is easily accumulated.

The joint 12 provides a connection between the in-tank fuel line 25 connected to the fuel shutoff valve 11 and an external fuel line (external passage) 26 connected to the canister 15. In addition, the joint 12 is disposed on the right section in the vehicle-width direction of the fuel tank 10C or, in other words, between the fuel shutoff valve 11 and the canister 15. Furthermore, the joint 12 is located on the right upper surface 10f of the fuel tank 10C.

The canister 15 is disposed to the right of the fuel tank 10C so as to be located across the right section of the fuel tank 10C from the fuel shutoff valve 11 and is connected to the joint 12 via the external fuel line 26.

As shown in FIG. 6, in the fuel shutoff structure 100C described above, the fuel shutoff valve 11 becomes submerged in the fuel if the fuel tank 10C is inclined with, for example, its left side tilting downward (namely, lower left side and higher right side). At this time, the in-tank fuel line 25 is inclined upward toward the canister 15 (or the right side), preventing the fuel from flowing into the in-tank fuel line 25. In contrast, if the fuel tank 10C is inclined with its right side tilting downward (namely, higher left side and lower right side), the fuel shutoff valve 11 does not become submerged in the fuel and accordingly the fuel does not flow into the in-tank fuel line 25, though not illustrated.

In the third embodiment described above, even if the fuel shutoff valve 11 becomes submerged in the fuel, a fuel outflow to the canister 15 from the fuel tank 10C can be prevented, as is the case in the first and second embodiments.

The present application is typically described with reference to, but not limited to, the foregoing embodiment. Various modifications are conceivable within the scope of the present application. For example, through the combination of the first and third embodiments, the fuel shutoff valve 11 may be displaced at the left rear section, while the joint 12 may be disposed at the right front section when the fuel tank is seen in plan view. In addition, the second and third embodiments may be combined. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A fuel shutoff structure that prevents a fuel outflow to an external passage disposed outside of a fuel tank mounted on a vehicle, the structure comprising:

the fuel tank having a top wall, the top wall including a recess portion recessed downward in a side view of the vehicle;
a fuel shutoff valve provided in the fuel tank;
an in-tank passage extending from the fuel shutoff valve in a front-rear direction of the fuel tank, the in-tank passage including a downward curve portion having a shape conforming to the recess portion of the top wall such that the downward curve portion protrudes downward in the side view, the fuel shutoff valve is disposed at one of a front side and a rear side of the downward curve portion in the side view;
a canister that is connected to the external passage, the canister being disposed at the other of the front side and the rear side of the downward curve portion such that the canister is disposed opposite to the fuel shutoff valve with respect to the downward curve portion in the side view; and
a joint joining the in-tank passage and the external passage, the joint being disposed between the canister and the downward curve portion in the side view such that the joint is disposed at the other of the front side and the rear side of the downward curve portion and the recess portion,
wherein the recess portion includes a downward-extending front surface, a downward-extending rear surface and a bottom portion in the side view, the downward-extending front surface being disposed on a front side of the bottom portion in the front-rear direction, and the downward-extending rear surface being disposed on a rear side of the bottom portion in the front-rear direction.

2. The fuel shutoff structure according to claim 1, wherein the fuel shutoff valve is disposed at the rear side of the downward curve portion,
the fuel tank includes a rear section located at the rear side of the downward curve portion and a front section located at the front side of the downward curve portion, and
the rear section is configured to have higher height than the front section.

3. The fuel shutoff structure according to claim 1, wherein the joint is disposed on an upper surface of the fuel tank.

4. The fuel shutoff structure according to claim 1, wherein the downward curve portion has a substantially U shape in the side view.

5. The fuel shutoff structure according to claim 1, further comprising a chamber communicating the in-tank channel with an inside of the fuel tank, the chamber is provided to the downward curve portion.

6. The fuel shutoff structure according to claim 5, further comprising a pump communicating the chamber with the inside of the fuel tank, wherein the pump is disposed at a position offset from the fuel shutoff valve both in a vertical direction and in a horizontal direction.

7. A fuel shutoff structure that prevents a fuel outflow to an external passage disposed outside of a fuel tank mounted on a vehicle, the structure comprising:
a fuel shutoff valve provided in the fuel tank;
an in-tank passage extending from the fuel shutoff valve in a right-left direction of the fuel tank, the in-tank passage including a downward curve portion protruding downward in a front side view of the vehicle, the fuel shutoff valve is disposed at one of a right side and a left side of the downward curve portion in the front side view;
a canister that is connected to a downstream side of the external passage, the canister being disposed at the other of the right side and the left side of the downward curve portion such that the canister is disposed opposite to the fuel shutoff valve with respect to the downward curve portion in the front side view; and
a joint joining the in-tank passage and the external passage, the joint being disposed between the canister and the downward curve portion in the front side view such that the joint is disposed at the other of the right side and the left side of the downward curve portion and the recess portion,
wherein the recess portion includes a downward-extending right surface, a downward-extending left surface and a bottom portion in the front side view, the downward-extending right surface being disposed on a right side of the bottom portion in the right-left direction, and the downward-extending left surface being disposed on a left side of the bottom portion in the right-left direction.

8. The fuel shutoff structure according to claim 7, wherein the fuel shutoff valve is disposed at the right side of the downward curve portion,
the fuel tank includes a right section located at the right side of the downward curve portion and a left section located at the left side of the downward curve portion, and
the right section is configured to have higher height than the left section.

9. The fuel shutoff structure according to claim 7, wherein the fuel shutoff valve is disposed at the left side of the downward curve portion,
the fuel tank includes a left section located at the left side of the downward curve portion and a right section located at the right side of the downward curve portion, and
the left section is configured to have higher height than the right section.

10. The fuel shutoff structure according to claim 7, wherein the joint is disposed on an upper surface of the fuel tank.

11. The fuel shutoff structure according to claim 7, wherein the downward curve portion has a substantially U shape in the front side view.

12. The fuel shutoff structure according to claim 7, further comprising a chamber communicating the in-tank channel with an inside of the fuel tank, the chamber is provided to the downward curve portion.

13. The fuel shutoff structure according to claim 12, further comprising a pump communicating the chamber with the inside of the fuel tank, wherein the pump is disposed at a position offset from the fuel shutoff valve both in a vertical direction and in a horizontal direction.

* * * * *